United States Patent [19]

Taguchi

[11] Patent Number: 4,691,257
[45] Date of Patent: Sep. 1, 1987

[54] DUST PROTECTION APPARATUS FOR A MAGNETIC DISC DRIVE

[75] Inventor: Katsuhiko Taguchi, Chofu, Japan

[73] Assignee: Tokyo Juki Industrial Co., Ltd., Japan

[21] Appl. No.: 767,081

[22] Filed: Aug. 19, 1985

[30] Foreign Application Priority Data

Aug. 28, 1984 [JP] Japan ............................ 59-130022[U]

[51] Int. Cl.⁴ ........................ G11B 5/012; G11B 5/016
[52] U.S. Cl. ...................................... 360/97; 360/99; 369/77.2
[58] Field of Search ..................................... 360/97–99, 360/105; 369/77.1, 77.2

[56] References Cited

U.S. PATENT DOCUMENTS 4,454,599  6/1984  Tsuchiya .......................... 360/133 X
4,523,240  6/1985  Dunstan ................................ 360/99

FOREIGN PATENT DOCUMENTS 2809060  9/1979  Fed. Rep. of Germany ........ 360/99

Primary Examiner—A. J. Heinz
Attorney, Agent, or Firm—Schwartz & Weinrieb

[57] ABSTRACT

A dust protection device provided at an inlet portion of a magnetic disc drive allows insertion and ejection of a disc without exposing the inside of the disc drive. The dust protection device includes an upper cover which closes by gravity and a lower cover which opens and closes in conjunction with the movement of a slider in the disc drive.

20 Claims, 5 Drawing Figures

DUST PROTECTION APPARATUS FOR A MAGNETIC DISC DRIVE

FIELD OF THE INVENTION

This invention pertains to disc drives for floppy discs. More particularly, the invention pertains to a dust protection device provided at the inlet portion of a disc drive.

BACKGROUND OF THE INVENTION

Driving mechanisms of disc drives for floppy discs are well known. Conventional disc drives do not provide dust protection devices at the inlet portion. Some disc drives leave their inlets open. Others provide simple covers which are closed during machine operation and shut-down periods, but are open when discs are inserted or ejected. In the former case, leaks are unavoidable since they are always left open, while in the latter case, there is a possibility of dust leaks since the inlets are exposed when discs are inserted or ejected. Thus, complete dust protection for such discs drives has heretofore not been provided.

OBJECTS OF THE INVENTION

An object of the invention is therefore to provide a dust protection device for a disk drive which provides complete dust protection.

It is a further object to provide a dust protection device for a floppy disk drive which provides complete dust protection, even during insertion or ejection of the disk.

SUMMARY OF THE INVENTION

These and other objects of the invention are met by providing a dust protection device for a disk drive comprising an upper cover and a lower cover. The upper cover closes the inlet during machine-off time, while the lower cover closes the inlet during machine-on time. The lower cover moves relative to the inlet in connection with the movement of disc's inserting action thereby closing completely when the disc is loaded.

BRIEF DESCRIPTION OF THE DRAWINGS

The invention will be described more fully below by way of reference to the following drawings, in which.

DETAILED DESCRIPTION OF THE DRAWINGS

Figure 1:
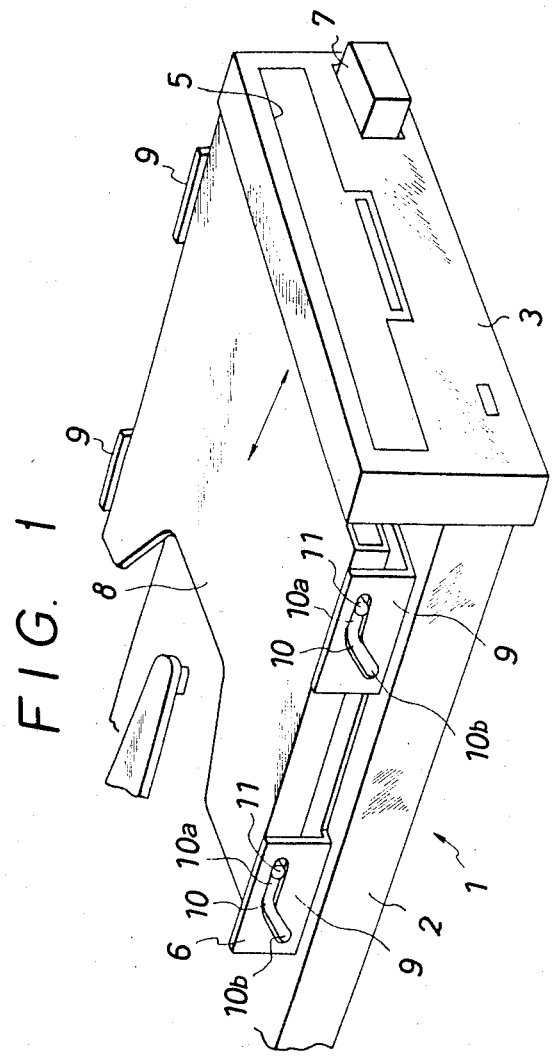
FIG. 1 is a perspective view of a disc drive for magnetic discs wherein the present invention is applied.
Figure 2:
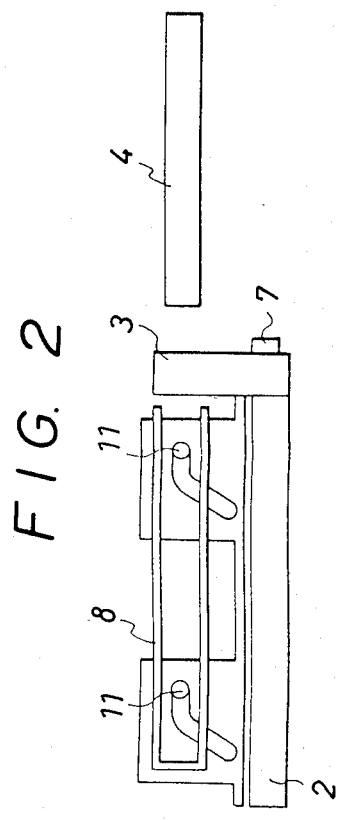
FIG. 2 is a side view of a disc drive for magnetic disc before a disc is inserted.
Figure 3:
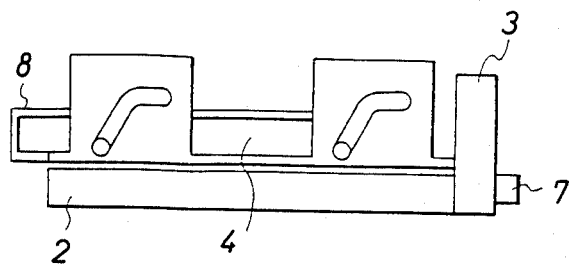
FIG. 3 illustrates a side view of a disc drive for magnetic discs when a disc is inserted.

Examples of the present invention are illustrated in the drawings. FIGS. 1 to 3 illustrate the mechanism for a disc drive wherein the present invention is applied. The disc drive comprises a body 1, which is common for this type of disc drive. The body 1 comprises a frame 2 and a front panel 3. The front panel has an inlet 5 wherein the magnetic disc is inserted or ejected. A slider 6 is positioned on the frame 2 and slides in both directions for insertion or ejection as the arrow in FIG. 1 illustrates. The slider moves in the direction of the front panel 3 by a spring force which is not illustrated in the drawings.

The slider 6 is engaged with a cassette-arm which is not illustrated on the drawings. The cassette-arm includes a sub-lever which is in contact with a cam located at the slider portion.

When the magnetic disc 4 is inserted into the disc drive, the slider is moved by a spring in the direction of the front panel 3 through a pre-determined distance. Since the mechanism of this slider and its action are well-known, further explanation is not necessary.

The front panel 3 is provided with a push button 7, which is operatively connected to the slider 6. The push button is pushed when the disc is to be ejected through the inlet 5 and out of the body. A holder 8 which receives a magnetic disc 4 is positioned upon slider 6.

The magnetic disc 4 is inserted into the holder 8 at approximately the same time as it is inserted into the inlet 5. The holder 8 is sustained upon the slider 6, such that it is allowed to slide freely. Upwardly projecting portions 9 are provided at both sides of the slider 6. In these upwardly projecting portions 9, grooves 10 are provided into which pins 11 projecting from the holder 8 are inserted such that they slide freely in the groove 10. The grooves 10 consist of a horizontal part 10a and a sloped part 10b. When the holder 8 is moved in the direction of the arrow in FIG. 1, the pins 11 are guided by the groove parts 10a and 10b, causing the holder 8 to move up and down. By this mechanism, when the magnetic disc 4 is inserted through the inlet 5 and into the holder 8, it is moved downward. The push button 7, which is operatively connected to the slider 6, projects outwards as the slider 6 moves in the direction of front panel 3. When the magnetic disc is to be ejected, the push button 7 is pressed, causing the slider to move away from the front panel 3, and the holder 8 to move upward, ejecting the magnetic disc 4 through the inlet and out of the disc drive.

Figure 4:
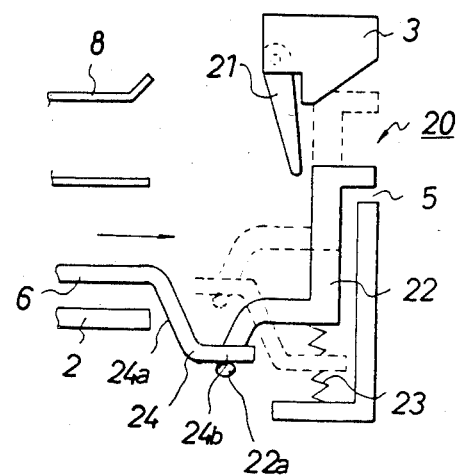
FIG. 4 illustrates an example of the present invention with an enlarged side view of the dust prevention device.

At the inlet 5, a shutter device 20 is provided. An example of this shutter device is illustrated in FIG. 4. The shutter device consists of an upper cover 21 located on the upper side of the inlet 5 and a lower cover 22 located on the lower side of the inlet 5. One end of upper cover 21 is hinged to the front panel 3 as a flap, and the other end is positioned to close the inlet. The upper cover 21 closes the inlet 5 by gravity. When the magnetic disc is inserted, the upper cover 21 is rotated clockwise (FIG. 4), and the inlet is opened.

The lower cover 22 is held at the main body 1 so that it can move vertically. A spring 23 exerts a constant upward force on the lower cover. At the lower portion of this lower cover 22, a pin 22a is provided. This pin engages with a cam 24 provided at the end of the slider 6. The cam 24 consists of a sloped portion 24a and horizontal portion 24b. Referring to FIG. 4, when the slider 6 moves in the direction of the arrow, the pin 22a which faces the horizontal portion 24b, is made to slide so as to face the sloped portion 24a, causing the lower cover 22 to move upward by the force of the spring 23, closing the inlet 5, as the slider 6 moves into the position illustrated by the dotted line. When the slider moves from the dotted line position to the solid line position (FIG. 4), the lower cover 22 is pushed downward by the motion of the cam 24.

Thus, in the example described above, when the magnetic disc is inserted into the holder 8 and the holder is moved downward simultaneously, the slider moves in the direction of the arrow as illustrated in FIG. 4. The inlet is thus closed by the lower cover 22.

When the button is pushed to eject the magnetic disc, the slider 6 moves in the direction opposite the arrow in FIG. 4 and the lower cover 22 opens the inlet 5. Through this open inlet the magnetic disc is ejected.

Figure 5:
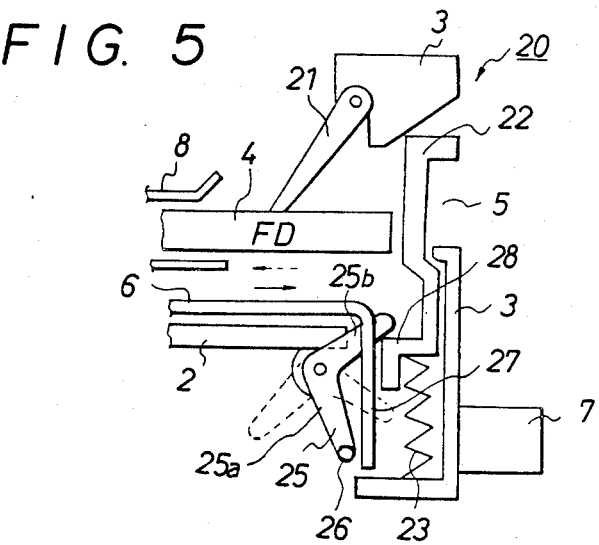
FIG. 5 illustrates a further example of the present invention with an enlarged side view of the dust prevention device.

FIG. 5 illustrates another example of the dust prevention invention. In this example, a bell-crank 25 pivoted on the frame 2 is provided instead of the cam 24 formed at the slider 6. At one arm 25a of the bell-crank 25, a pin 26 is provided at its end. This pin 26 and lower portion (vertical portion) of the slider 6 are engaged so that they may slide freely. The end of another arm 25b contacts with a shoulder 28 formed at the lower portion of lower cover 22 such that the arm 25b is permitted to slide freely.

Referring to FIG. 5, when the slider 6 moves in the direction of the dotted arrow, the vertical shank or lever portion 27 pushes the pin 26 and turns the bell-crank clockwise and thus the arm 25b pushes down the lower cover against the force of the spring 23 so that the inlet 5 opens. Conversely, if the slider 6 moves in the direction of the solid arrow at the above described position, the lower cover 22 is moved upward by the force of the spring 23, and closes the inlet 5.

Thus, the invention provides for closing the inlet not only while the disk drive is in operation and after the disk has been removed, but also during insertion and ejection of the magnetic disc, without exposing the inside of machine. Thereby, dust leaks into the machine are greatly reduced and associated troubles caused by such dust leaks are avoided.

As many apparently widely different embodiments of the invention may be made without departing the spirit and scope therein, it is to be understood that this invention is not limited to the specific embodiment thereof, except as defined in the appended claims.

I claim:

1. In a disc drive, a system for preventing the introduction of dust into the interior of said disc drive, comprising:
   a disc drive body;
   means defining an inlet aperture within a sidewall of said disc drive body through which a disc may be inserted and ejected;
   a first cover for covering and uncovering said inlet aperture means of said disc drive body;
   means movably mounting said first cover upon said disc drive body between a first position at which said first cover covers said inlet aperture means in the absence of said disc being disposed within said disc drive body, and a second position at which said first cover uncovers said inlet aperture means of said disc drive body when said disc is fully inserted within said disc drive body;
   a second cover for covering and uncovering said inlet aperture means of said disc drive body; and
   means movably mounting said second cover upon said disc drive body between a first position at which said second cover uncovers said inlet aperture means of said disc drive body in the absence of said disc being disposed within said disc body and when said first cover covers said inlet aperture means of said disc drive body, and a second position at which said second cover covers said inlet aperture means of said disc drive body when said disc is fully inserted within said disc drive body and when said first cover uncovers said inlet aperture means of said disc drive body.

2. A system as set forth in claim 1, wherein:
   said inlet aperture means is defined within a vertical sidewall of said disc drive body.

3. A system as set forth in claim 2, wherein:
   said first cover is hingedly mounted upon said disc drive body at a location disposed vertically above said inlet aperture means so as to be disposed within a substantially vertical plane at said first position under the influence of gravity, and pivotably moved about the hinge axis thereof toward said second position upon insertion of said disc into said disc drive body through said inlet aperture means.

4. A system as set forth in claim 2, wherein
   said second cover is reciprocatingly mounted upon said disc drive body within a substantially vertical plane between said first and second positions thereof.

5. A system as set forth in claim 4, further comprising:
   means for transporting said disc within said disc drive body between an insertion/ejection position and a loaded position; and wherein
   said second cover is operatively connected to said disc transporting means so as to be disposed at said first position uncovering said inlet aperture means when said disc transporting means is disposed at said insertion/ejection position, and at said second position covering said inlet aperture means when said disc transporting means is disposed at said loaded position.

6. A system as set forth in claim 5, wherein:
   said disc transporting means comprises a reciprocating slide mechanism movable within a substantially horizontal plane.

7. A system as set forth in claim 6, wherein:
   said reciprocating slide mechanism comprises cam means for controlling the movement of said second cover between said first and second positions; and
   said second cover comprises cam follower pin means for engagement with said reciprocating slide cam means,
   whereby when said disc transporting means moves within said substantially horizontal plane between said insertion/ejection and loaded position, said second cover moves within said substantially vertical plane between said first and second positions.

8. A system as set forth in claim 7, further comprising:
   spring means interposed between said second cover and said disc drive body for biasing said second cover cam follower pin means into contact with said reciprocating slide cam means and toward said second position covering said inlet aperture means of said disc drive body.

9. A system as set forth in claim 6, further comprising:
   bell-crank means pivotably mounted upon said disc drive body and comprising a first arm having a pin formed upon a free end portion thereof, and a second arm having a free end portion thereof disposed in contact with said second cover; and
   said reciprocating slide mechanism comprises a dependent shank portion for engagement with said pin of said first arm of said bell-crank means so as to control the pivotable movement of said bell-crank means, whereby when said disc transporting means moves within said substantially horizontal plane between said insertion/ejection and loaded positions, said shank portion of said reciprocating slide mechanism controls the pivotable movement of said bell-crank means which, in turn, controls the movement of said second cover within said substantially vertical plane between said first and second positions.

10. A system as set forth in claim 9, further comprising:
spring means interposed between said second cover and said disc drive body for biasing said second cover into contact with said free end portion of said second arm of said bell-crank means and toward said second position covering said inlet aperture means of said disc drive body.

11. A system as set forth in claim 1, further comprising:
spring means interposed between said second cover and said disc drive body for biasing said second cover toward said second position covering said inlet aperture means of said disc drive body.

12. In a disc drive, a system for preventing the introduction of dust into the interior of said disc drive, comprising:
a disc drive body;
means defining an inlet aperture within a sidewall of said disc drive body through which a disc may be inserted and ejected;
a first cover for covering and uncovering said inlet aperture means of said disc drive body;
means movably mounting said first cover upon said disc drive body between a first position at which said first cover covers said inlet aperture means of said disc drive body in the absence of said disc being disposed within said disc drive body, and a second position at which said first cover uncovers said inlet aperture means of said disc drive body when said disc is fully inserted within said disc drive body, as well as at positions, intermediate said first and second positions and corresponding to insertion and ejection of said disc into and out of said disc drive body, at which said first cover cooperates with said disc to cover said inlet aperture means of said disc drive body;
a second cover for covering and uncovering said inlet aperture means of said disc drive body; and
means movably mounting said second cover upon said disc drive body between a first position at which said second cover uncovers said inlet aperture means of said disc drive body in the absence of said disc being disposed within said disc drive body and when said first cover covers said inlet aperture means of said disc drive body, and a second position at which said second cover covers said inlet aperture means of said disc drive body when said disc is fully inserted within said disc drive body and when said first cover uncovers said inlet aperture means of said disc drive body, as well as at positions, intermediate said first and second positions and corresponding to said insertion and ejection of said disc into and out of said disc drive body, at which said second cover partially covers said inlet aperture means of said disc drive body while said first cover cooperates with said disc so as to cover a remaining portion of said inlet aperture means of said disc drive body.

13. A system as set forth in claim 12, wherein:
said inlet aperture means is defined within a vertical sidewall of said disc drive body.

14. A system as set forth in claim 13, wherein:
said first cover is hingedly mounted upon said disc drive body at a location disposed vertically above said inlet aperture means so as to be disposed within a substantially vertical plane at said first position under the influence of gravity, and pivotably moved about the hinge axis thereof toward said second position upon insertion of said disc into said disc drive body through said inlet aperture means.

15. A system as set forth in claim 13, wherein:
said second cover is reciprocatingly mounted upon said disc drive body within a substantially vertical plane between said first and second positions thereof.

16. A system as set forth in claim 15, further comprising:
means for transporting said disc within said disc drive body between an insertion/ejection position and a loaded position; and wherein
said second cover is operatively connected to said disc transporting means so as to be disposed at said first position uncovering said inlet aperture means when said disc transporting means is disposed at said insertion/ejection position, and at said second position covering said inlet aperture means when said disc transporting means is disposed at said loaded position.

17. A system as set forth in claim 16, wherein:
said disc transporting means comprises a reciprocating slide mechanism movable within a substantially horizontal plane.

18. A system as set forth in claim 17, wherein:
said reciprocating slide mechanism comprises cam means for controlling the movement of said second cover between said first and second positions; and
said second cover comprises cam follower pin means for engagement with said reciprocating slide cam means,
whereby when said disc transporting means moves within said substantially horizontal plane between said insertion/ejection and loaded positions, said second cover moves within said substantially vertical plane between said first and second positions.

19. A system as set forth in claim 17, further comprising:
bell-crank means pivotably mounted upon said disc drive body and comprising a first arm having a pin formed upon a free end portion thereof, and a second arm having a free end portion thereof disposed in contact with said second cover; and
said reciprocating slide mechanism comprises a dependent shank portion for engagement with said pin of said first arm of said bell-crank means so as to control the pivotable movement of said bell-crank means,
whereby when said disc transporting means moves within said substantially horizontal plane between said insertion/ejection and loaded positions, said shank portion of said reciprocating slide mechanism controls the pivotable movement of said bell-crank means which, in turn, controls the movement of said second cover within said substantially vertical plane between said first and second positions.

20. A system as set forth in claim 12, further comprising:
spring means interposed between said second cover and said disc drive body for biasing said second cover toward said second position covering said inlet aperture means of said disc drive body.

* * * * *